United States Patent
Döhring

(10) Patent No.: US 11,629,512 B2
(45) Date of Patent: *Apr. 18, 2023

(54) HEAT-TREATED PVC-PLASTIC PANEL

(71) Applicant: Xylo Technologies AG, Niederteufen (CH)

(72) Inventor: Dieter Döhring, Großenhain (DE)

(73) Assignee: Xylo Technologies AG, Niederteufen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/541,396

(22) Filed: Dec. 3, 2021

(65) Prior Publication Data

US 2022/0090394 A1    Mar. 24, 2022

Related U.S. Application Data

(62) Division of application No. 16/482,872, filed as application No. PCT/EP2018/052672 on Feb. 2, 2018, now Pat. No. 11,230,847.

(30) Foreign Application Priority Data

Feb. 3, 2017  (WO) .................. PCT/EP2017/052369

(51) Int. Cl.
*B32B 3/00* (2006.01)
*E04F 15/10* (2006.01)
(Continued)

(52) U.S. Cl.
CPC .............. *E04F 15/107* (2013.01); *B05D 1/36* (2013.01); *B05D 1/40* (2013.01); *B05D 3/067* (2013.01);
(Continued)

(58) Field of Classification Search
CPC ......... B32B 27/08; B32B 27/304; B05D 1/36; B05D 1/40; B05D 3/067; B44C 5/0476
See application file for complete search history.

(56) References Cited

U.S. PATENT DOCUMENTS

| | | | |
|---|---|---|---|
| 9,598,866 B2 | 3/2017 | Doehring | |
| 11,149,447 B2 * | 10/2021 | Döhring | B05D 7/04 |

(Continued)

FOREIGN PATENT DOCUMENTS

| | | |
|---|---|---|
| AU | 2012292184 A1 | 2/2014 |
| AU | 2014284755 A1 | 12/2015 |

(Continued)

OTHER PUBLICATIONS

Original Belarusian Granting Decision issued for corresponding Belarusian Application No. a 20190255, dated Apr. 30, 2021.

(Continued)

*Primary Examiner* — Elizabeth E Mulvaney
(74) *Attorney, Agent, or Firm* — Renner, Otto, Boisselle & Sklar, LLP

(57) ABSTRACT

A method of treating PVC plates as well as plates and panels manufactured by this method. The plates and panels, in particular wall, ceiling or floor panels, comprise a heat-treated carrier plate based on polyvinyl chloride with a density of, for example, 900 to 2,500 kg/m³ and a film applied thereon. The film is a thin PVC-film and comprises a decorative pattern directly printed thereon.

20 Claims, 4 Drawing Sheets

(51) Int. Cl.
  B05D 1/36    (2006.01)
  B05D 1/40    (2006.01)
  B05D 3/06    (2006.01)
  B05D 7/04    (2006.01)
  B44C 5/04    (2006.01)
  E04F 13/077  (2006.01)
  B32B 27/08   (2006.01)
  B32B 27/30   (2006.01)
  B44F 9/02    (2006.01)
  B44F 9/04    (2006.01)
  E04F 15/02   (2006.01)

(52) U.S. Cl.
  CPC ............... B05D 7/04 (2013.01); B32B 27/08 (2013.01); B32B 27/304 (2013.01); B44C 5/0453 (2013.01); B44C 5/0476 (2013.01); E04F 13/077 (2013.01); B32B 2255/10 (2013.01); B32B 2255/26 (2013.01); B32B 2307/536 (2013.01); B32B 2307/732 (2013.01); B32B 2419/00 (2013.01); B32B 2607/00 (2013.01); B44C 5/0461 (2013.01); B44F 9/02 (2013.01); B44F 9/04 (2013.01); E04F 15/02038 (2013.01)

(56) References Cited

U.S. PATENT DOCUMENTS

| | | | |
|---|---|---|---|
| 11,230,847 B2 * | 1/2022 | Döhring | ................ B32B 27/304 |
| 2011/0296780 A1 | 12/2011 | Windmöller | |
| 2016/0136913 A1 | 5/2016 | Hannig | |
| 2017/0106578 A1 | 4/2017 | Lombaert et al. | |

FOREIGN PATENT DOCUMENTS

| | | |
|---|---|---|
| CA | 2224947 A1 | 7/1998 |
| CA | 2868999 C | 10/2018 |
| CA | 2868842 C | 3/2019 |
| CN | 104245350 A | 12/2014 |
| DE | 19702476 A1 | 7/1998 |
| DE | 10 2006 029 963 A1 | 1/2008 |
| DE | 10 2006 058 655 A1 | 6/2008 |
| DE | 10 2010 011602 A1 | 9/2011 |
| EA | 201690092 A1 | 5/2016 |
| EP | 3 088 205 A1 | 11/2016 |
| FR | 2805548 A1 | 8/2001 |
| RU | 2297921 C1 | 4/2007 |
| RU | 2564593 C2 | 10/2015 |
| RU | 2014143465 | 5/2016 |
| RU | 2587552 C2 | 6/2016 |
| RU | 2604855 C2 | 12/2016 |
| UA | a2016 01637 | 4/2016 |
| WO | 2008/061791 A1 | 5/2008 |
| WO | 2011/141849 A2 | 11/2011 |

OTHER PUBLICATIONS

International Search Report and Written Opinion for corresponding Patent Application No. PCT/EP2018/052672 dated Apr. 19, 2018.
International Preliminary Report on Patentability for corresponding Patent Application No. PCT/EP2018/052672 dated Feb. 5, 2019.
Translation of Inquiry of Substantive Examination dated Jul. 29, 2020, for related Russian Patent Application No. 2019126461/03(051881).
Original and Translation of Ukrainian Granting Decision issued for corresponding Ukrainian Application No. a 2019 09625, dated Feb. 12, 2021.

* cited by examiner

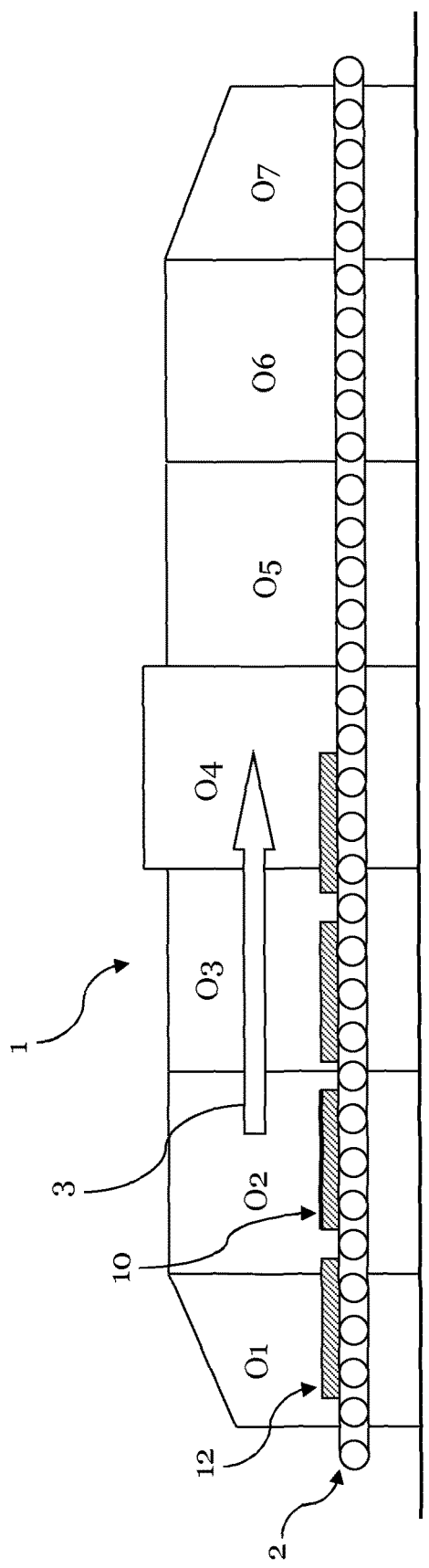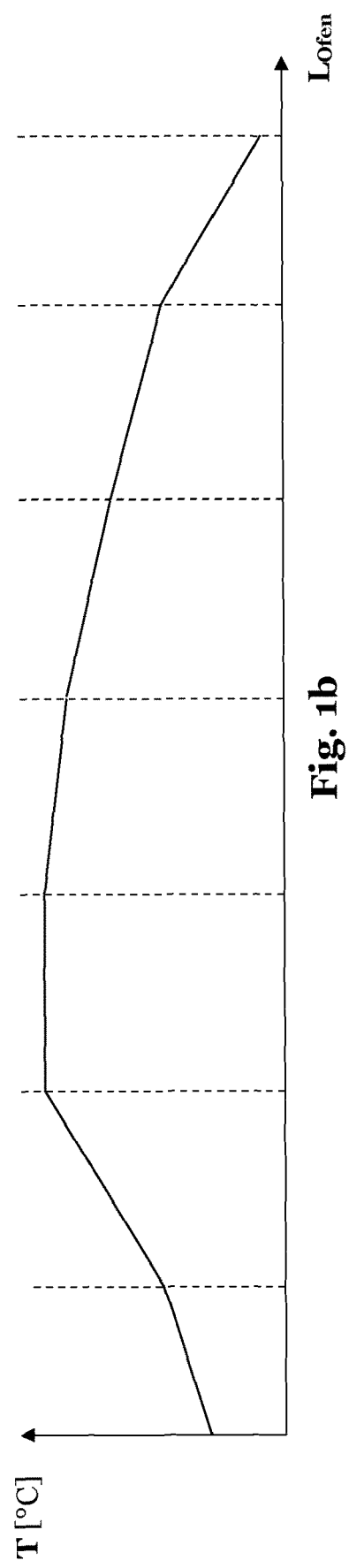
Fig. 1a
Fig. 1b

HEAT-TREATED PVC-PLASTIC PANEL

RELATED APPLICATION DATA

This application is a divisional of U.S. patent application Ser. No. 16/482,872 filed Aug. 1, 2919, which is a national phase of International Patent Application No. PCT/EP2018/052672 filed Feb. 2, 2018, which claims priority of International Application No. PCT/EP2017/052369 filed Feb. 3, 2017, all of which are hereby incorporated herein by reference.

FIELD OF THE INVENTION

The present invention concerns a method for treating PVC plates, an improved panel, in particular a wall, ceiling or floor panel, based on a hard PVC (PVC-U) carrier plate, and a method for its manufacture.

BACKGROUND

Polyvinyl chloride has long been used in the manufacture of floor coverings. Polyvinyl chloride (PVC) is a thermoplastic material that is hard and brittle without the addition of additives. However, the mechanical properties of PVC can be adjusted over a wide range by adding suitable auxiliary materials such as plasticizers, fillers, colorants, stabilizers, etc. For this reason, the term "PVC" in this document does not refer to pure polyvinyl chloride, but to PVC with the additives normally added and necessary for practical use, unless otherwise specified.

A typical example from the state of the art is described in the publication DE 10 2006 058 655 A1. This publication discloses a floor panel in the form of a multi-layer rectangular laminate with a carrier plate made of a soft polyvinyl chloride and a décor paper layer arranged on top of the polyvinyl chloride layer. The application of a décor paper sheet is technically complex and involves considerable costs.

From DE 10 2006 029 963 A1 a floor covering made of polyvinyl chloride is known, which is coated with a hard-wearing lacquer layer in order to improve the durability of the PVC floor covering. The lacquer layer is based on an acrylate resin and is to be cured with radiation. The core of this publication lies in the addition of electrically conductive substances to the acrylate resin to provide the finished floor covering with antistatic and/or electrically conductive properties.

The WO 2008/061791 A1 of the same applicant represents a further development of a lacquer coating. The content of this publication is hereby incorporated in its entirety by reference. The core of the improvement of this publication lies in the fact that two liquid, different polymer layers are applied wet-on-wet to the surface of a panel, so that a partial mixing of the coating agents takes place. These two wet-on-wet coatings are then cured together, with the cured resulting coating having a hardness gradient due to partial mixing, with the hardness of the coating decreasing with increasing depth from the surface of the resulting coating.

A fundamental problem with PVC plates, and therefore also with panels or floors made of PVC, is that they are not resistant to high thermal loads, such as solar radiation. For example, PVC plates warp or bend when exposed to direct sunlight. This can occur when the tiles are used as flooring and are installed close to large window areas, such as in a winter garden or the like. Other thermal influences, such as radiators, can also lead to warpage and curvature of PVC plates, so that their use in homes, for example, is subject to certain restrictions.

In the light of these known PVC plates and their disadvantages, the present invention aims to provide a method for the treatment of PVC plates to improve the resistance of known plates. In particular, it is the task of the invention to provide a method for the treatment of PVC plates which can increase the resistance of the plates to solar radiation and thermal stress. A further task is to provide an improved panel, in particular a wall, ceiling or floor panel, comprising a support plate of (in particular) hard PVC. Another task is to provide such a panel that has improved durability and high-quality decorative patterns.

These and other tasks, which are still mentioned when reading this description or can be identified by an expert, can be solved by a method for the treatment of a PVC plate according to the following description, a panel as described below, and a method for its manufacture as described below.

SUMMARY OF THE INVENTION

The present invention concerns a method of treating a polyvinyl chloride (PVC) plate comprising the following steps in the given order: providing a PVC plate; heating the PVC plate in an oven to at least 70° C.; and cooling the heated plate. The method therefore concerns the heat treatment of PVC plates. Surprisingly, it has been found that such a heat treatment leads to a significant improvement in the resistance of known PVC plates, particularly to heat and/or solar radiation. It is assumed that the heating of the plates up to and preferably above the glass transition temperature (glass temperature) leads to a reduction in the internal stresses of the plate. For this purpose, the plates should be heated to at least 70° C., as this temperature is close to the glass transition temperature of conventional PVC plates, especially hard PVC. Although the physical and chemical relationships are not clear, it is suspected that heating and subsequent cooling leads to a reorientation of the macromolecules, which leads to a reduction in internal stresses, or ultimately to an improvement in the plate's resistance. In particular, the treatment of the PVC plate according to the invention can effectively reduce or prevent distortion of the plate or the occurrence of curvatures when the PVC plate is exposed to strong direct sunlight, for example. The treatment according to the present invention can be carried out on otherwise untreated PVC plates, such as those coming out of the extruder. However, it can also be applied subsequently to panels which have PVC plates as support plates and which may have additional layers. Examples of such panels are described in more detail in this Disclosure.

Preferably the plate is heated to at least its glass transition temperature and especially preferably to at least 75° C., more preferably to at least 79° C., more preferably to at least 81° C., even more preferably to at least 85° C. The glass transition temperature of PVC is about 80° C., but depending on the additives used, it can also be slightly lower or higher. For the purposes of this invention, it is advantageous if the glass transition temperature of the PVC used is slightly exceeded, i.e., by a few degrees. The PVC plate should preferably reach the desired temperature completely, i.e., the core of the plate should also preferably have the desired minimum temperature. Due to the low thermal conductivity of PVC, however, it may take relatively long for the core, i.e., the innermost layer, of the PVC plate to reach the desired temperature. It is therefore preferred to use the thermal energy during the extrusion of the plate and not to allow the plate to cool completely after extrusion. Instead, the plate is allowed to cool to only 40-50° C. and then heated to above glass temperature in an oven. The entire plate volume should preferably be evenly heated. In this way, particularly dimensionally stable plates are achieved.

Preferably the plate is kept at the minimum temperature for at least 3 minutes, more preferably at least 5 minutes and most preferably at least 10 minutes. It has been shown that the internal stresses of the plate, or the intended and inventive effect, can be most safely achieved if the plate is kept at the desired minimum temperature for some time before being cooled down again.

Furthermore, the plate is preferably heated with a heating gradient of 2° C./min to 20° C./min on average; preferably of 4° C./min to 15° C./min on average; more preferably of 6° C./min to 12° C./min on average and most preferably of 7° C./min to 10° C./min on average. The thermal conductivity of PVC is relatively low, so that slow heating is advantageous, as otherwise the outermost parts of the plate may be considerably above the desired minimum temperature, while the inside of the plate is still relatively cold. The slow heating in the given areas thus causes a uniform heating and thus a more uniform reorientation or realignment of the molecules (as far as this is understood, the exact effects of the heating on the orientation of the molecules are not yet fully known). It is assumed that this uniformity is decisive for the particularly good properties of such slowly heated plates. At a heating gradient of, for example, 1° C./min, the plate would heat up by approx. 60° C. in one hour. The heating at the beginning may be faster than towards the end of the process due to the high temperature difference between the still cold plate and the oven temperature, depending on the oven used and the type of heating. The heating gradient can therefore be greater at the beginning of the heating process than towards the end of the process, although this effect can be minimized by suitable oven selection or oven control. The data on the gradient are therefore to be understood here as average gradients, in the sense that a gradient of e.g., 2° C./min means that it takes approx. 40 minutes for a plate to be heated from 20° C. to 100° C. Again, it is sufficient that a large part of the plate's mass has been brought to the desired temperature, such as about 90% of the mass, although it is basically desirable that the plate is completely heated.

The cooling process is just as important as heating the plate. In the case of rapid and uneven cooling (e.g., shock cooling in a water bath at room temperature), only a slight or no improvement in stability can be observed despite previous heating. In order to achieve an improvement, the plate should be cooled down slowly and evenly to at least 50-40° C. Slow cooling, quite to room temperature, is advantageous. However, a clear improvement of the stability is to be registered also if the plate is driven into a water bath after reaching a temperature of 50° C., however, the water bath should have a water temperature of not less than 35-25° C. (depending on the initial temperature of the plate to be dipped; the temperature difference between plate and water bath should not be too large).

The plate is also preferably cooled down in a controlled manner, preferably in a cooling oven, and cooled uniformly over the surface to a minimum temperature in the plate core of 30-50° C. with a cooling gradient of 3° C./min to 20° C./min on average; preferably 5° C./min to 15° C./min on average; more preferably 7° C./min to 12° C./min on average and most preferably 8° C./min to 10° C./min on average. The cooling gradient should be understood in the same way as the heating gradient, i.e., as an average value until the plate has reached a core temperature of approximately 30 to 50° C., for example only 10 degrees warmer than the environment. The slow and controlled cooling leads to particularly resistant plates. It is assumed that the slow cooling leads to a good fixation of the orientation of the molecules.

Preferably the PVC plate is fed through the oven on a conveyor and the oven is a continuous oven. Heating and/or cooling in such a continuous method is particularly economical, since different heat zones with different temperatures can be realized in a continuous oven. Thus, for example, the temperature in the oven can be continuously increased or decreased in the transport direction through the oven, whereby uniform gradients for heating or cooling can be realized.

Preferably, cooling of the heated plate takes place in a continuous oven. Here, too, it is advantageous to provide different temperature ranges along the transport direction of the plates through the oven, so that the cooling gradient is kept as uniform as possible, for example by keeping the temperature difference between the plate and the environment of the oven approximately constant. The temperature inside the oven decreases advantageously along the transport direction of the plate through the oven (cooling oven). When the plate leaves the oven, it preferentially has a temperature similar to the ambient temperature, e.g., only 10° C. or 20° C. above the ambient temperature.

According to the present invention, a panel comprising a polyvinyl chloride plate (hereinafter referred to synonymously as plate and support plate in the description of the plate), preferably treated as described above, is also provided. A film is attached to the plate, wherein the film is a PVC film having a thickness of 0.04 to 0.2 mm and comprising a decorative pattern directly printed thereon, and a cured polymer layer is provided over the PVC film. The polymer layer is generally preferably based on a polymerizable resin, in particular an acrylate resin. In general, the cured polymer layer prefers a hardness gradient according to the WO 2008/061791 of the same applicant described at the beginning. Heat treatment of PVC plates is preferably carried out after application of the film (preferably PVC film). The decor printing and the application of further layers is preferably carried out after the heat treatment of the PVC plate provided with the film.

The plate of polyvinyl chloride consists in general preferably of hard PVC (also referred to as PVC-U), i.e., it essentially contains no or no plasticizers. This applies to all processes and products described herein.

In contrast to the above-mentioned state of the art DE 10 2006 058 655 A1, the present invention provides a panel that does not require a separate décor paper, as the decorative pattern is printed directly onto the PVC film. The PVC film has the advantage that it is possible to dispense with expensive pre-treatment of the carrier plate (although pre-treatment is of course possible, should this be desired). In particular, there is no need to grind the surface of the carrier plate, and the application of fillers and primers, which is typically necessary in the state of the art, can also be advantageously omitted if a PVC film is used in the thickness in accordance with the invention.

In a preferred embodiment, the polymer layer has a hardness gradient, so that the hardness of the polymer layer decreases essentially continuously with increasing depth as seen from the surface of the polymer layer. Such a layer with a hardness gradient is advantageous in combination with the relatively soft PVC film and, among other things, achieves good sound insulation.

The printing ink used for printing the decorative pattern is solvent based and preferably a UV printing ink. Such printing inks slightly dissolve the surface of the PVC film, resulting in a firm anchorage of the printing ink on the film. The use of UV inks also results in very good cross-linking of the ink with the surface of the PVC film. UV inks are therefore particularly preferred because they contain reactive solvents that are chemically incorporated into the later network, such as N-vinylcaprolactam.

Preferably a polymerizable printing ink (die) is therefore used for printing the decorative pattern, in particular based on polymerizable acrylic resins and/or N-vinylcaprolactam (a liquid reactive diluent) as offered by the company BASF. The applicants have surprisingly found that improved adhesion properties of the layer system can be achieved by using polymerizable printing inks instead of the common water-based emulsion inks. This applies in particular to the preferred application with a polymer layer, especially with a hardness gradient. Suitable weight proportions for the amount of polymerizable acrylate and N-vinylcaprolactam in the ink have been found to be 2 to 50, more preferred 5 to 40 and most preferred 10 to 30%. These values refer to the sum of acrylate and N-vinylcaprolactam. The proportion by weight of N-vinylcaprolactam in the printing ink, for example, is 3 to 12%.

The positive effect is particularly noticeable if the printing ink of the décor layer (i.e., the decorative pattern) and the polymer layer are cured or polymerized together (if the décor layer is printed directly on, as in digital printing, the décor layer virtually consists of the printing ink). Curing of a polymer layer or a polymerizable printing ink (such as polymerizable acrylates or UV-reactive inks in general) is understood to mean the chemical reaction that takes place during polymerization. The joint curing (polymerization) of the polymerizable components (acrylate systems and/or N-vinylcaprolactam) of the ink and polymer layer results in chemical crosslinking at the interface of the two layers, which is assumed to be responsible for the improved adhesion of the layers.

Polymerizable components, which are preferably used, include acrylates as their main components, in particular acrylate monomers, oligomers and optional photoinitiators, but also N-vinylcaprolactam as a liquid reactive diluent. N-vinylcaprolactam can be added to the printing ink as a thinner in addition to the acrylates and polymerizes together with these. Alternatively, it is also possible to dispense with the acrylates and provide a correspondingly larger amount of N-vinylcaprolactam, since the N-vinylcaprolactam itself can be polymerized. Details on this are known to the expert from the German publication DE 197 02 476 A1. In preferred embodiments, the polymerizable components therefore essentially consist of N-vinylcaprolactam. The photoinitiators effect a polymerisation of the monomers or oligomers under the influence of radiation, whereby the printing ink cures quickly.

Preferably the PVC film has a thickness from 0.05 to 0.15 mm, more preferably from 0.06 to 0.095 mm. Such thicknesses can be processed very well and especially applied with a calender. For example, the PVC film can be applied directly using a heated calender so that the film is thermally bonded/fused to the carrier plate. The use of an additional adhesive to attach the film to the carrier plate is then not necessary, although this is possible alternatively or additionally of course.

Preferably the polyvinyl chloride plate has a density of 900 to 2,500 $kg/m^3$, preferably 1,000 to 2,200 $kg/m^3$, more preferably 1,300 to 1,950 $kg/m^3$ and most preferably 1,350 to 1,500 $kg/m^3$. Such densities result in very robust and resistant plates, which are particularly advantageous when panels are used as floor coverings. In addition, these plates allow the incorporation of locking or coupling elements at the side edges of the plate, e.g., in order to be able to connect several similar plates with each other in a form-fitting manner.

A thickness (strength) for the PVC plate (or carrier plate) between 3 and 20 mm, preferably between 4 and 15 mm, more preferably between 3 and 12 mm and most preferably between 4 and 10 mm has proved to be advantageous. It has been found that these areas provide sufficient stability for the thickness of the carrier plate during the manufacturing process and also provide sufficient impact sound absorption (when used as flooring) and dimensional stability of the finished panel.

In a preferred embodiment, a layer comprising a UV primer is provided on the PVC film. This layer preferably has a surface mass of 1 to 20 $g/m^2$, more preferably 2 to 15 $g/m^2$, and most preferably 2 to 5 $g/m^2$. Dipropylene glycol diacrylate has proven to be a suitable material, e.g., in an amount of 2 $g/m^2$ it has a good effect. The primer is preferably applied to the printing ink and thus improves the adhesion between the printing ink, the substrate and the polymer layer. It has been shown that especially in areas with little ink the adhesion is improved by using the primer.

The PVC plate is generally preferably an extruded PVC plate.

In a preferred embodiment, abrasion-resistant particles, especially corundum particles, with an average diameter of 10 to 100 µm, preferably 20 to 80 µm, more preferably 25 to 70 µm and especially 30 to 60 µm are embedded in the polymer layer. The abrasion-resistant particles make it possible to considerably increase the lifetime of a panel according to the invention.

In a preferred embodiment, the decorative pattern, which is applied directly to the PVC film using a digital printing process, represents the only décor layer of the panel according to the invention, i.e., no further décor papers or décor films are provided. There is therefore no need to provide a separate décor paper or the like, which leads to a considerable reduction in costs and simplification of the manufacturing process for a panel according to the invention.

As mentioned at the beginning, according to a preferred embodiment of the invention, the printing ink of the décor layer (of the decorative pattern) is cured (polymerized) together with the polymer layer applied over it, preferably by irradiating it together. This results in a partial chemical crosslinking of the polymers used at the interface between the printing ink and the polymer layer(s) applied above it. It has been shown that a particularly good adhesion of the polymer layer to the carrier plate can be achieved.

According to this invention, a method of manufacturing a panel, in particular a wall, ceiling or floor panel, is also provided.

The first step in this method is to provide a polyvinyl chloride plate (carrier plate), which has preferably been treated with one of the methods described above (heat treatment/temperature treatment). In addition, the panel preferably has a density of 900 to 2,500 $kg/m^3$. Alternatively, an untreated PVC plate can also be provided, and the heat treatment described above can only be carried out after some or all of the other layers have been applied to the plate. A PVC film with a thickness of 0.04 to 0.2 mm, preferably by means of a calender, is applied to this carrier plate and then the heat treatment is preferably carried out. After the heat treatment, a decorative pattern is printed on the PVC film.

After printing the decorative pattern on the PVC film, a liquid first polymer layer is applied to the primer layer. In a further step, the polymer layer is cured, preferably together with the printing ink. Optionally, at least a second polymer layer can be applied in liquid form to the still wet first polymer layer so that the coating agents are partially mixed. The curing of the printing ink and the polymer layer(s) can take place in one method step but also successively in two separate method steps. Hardening or curing of a polymer layer is understood to be the chemical reaction that takes place during polymerization. A distinction must be made between this and the drying of such layers, in which only the water content is reduced or removed.

Preferably the first and second polymer layers are applied such that the cured polymer layer has a hardness gradient, wherein the hardness of the coating decreases with increasing depth as seen from the surface of the resulting coating. This process is described in more detail in the WO 2008/061791 A1 mentioned at the beginning, so that no further details are given here.

Preferably, a heated calender is used in such a way that the PVC film is thermally welded to the carrier layer. In this way, the film can be applied and fastened easily and safely in a single step.

Furthermore, the directly printed decorative pattern preferably imitates a wood, stone or tile surface. The PVC film is generally preferred unicoloured or white. This provides a good background colour for most commercially used decors.

In the following, the advantages will be explained in more detail using two non-restrictive examples:

Reference Example: "Panel with Conventional Indirect Gravure Printing".

A PVC carrier plate with a thickness of 4 mm is first provided with a primer based on a commercially available aqueous acrylic dispersion via a roller applicator. In the next step, the PVC carrier plate is smoothed by a roller applicator using a smoothing compound based on a highly filled aqueous acrylate dispersion. Subsequently, a primer based on an aqueous acrylate dispersion mixed with fillers and colour pigments is applied by casting. After each of these coating steps, intermediate drying is carried out at temperatures between 80 and 200° C. The PVC carrier plates treated in this way are supplied to a printing machine essentially consisting of an engraving roller and a rubber roller for transferring the print image from the engraving roller (engraving cylinder) to the plate. The print image is produced by three downstream printing units, whereby each printing unit applies its own printing ink consisting of ink pigments and an aqueous acrylic dispersion. For example, if a dark walnut wood is imitated, 5 g/m² of printing ink is applied. A commercial UV primer is then applied to the ink layer via a roller applicator. Finally, the polymer layer is applied as described in WO 2008/061791 to produce a polymer layer with a hardness gradient.

Example: "Panel Where the Pattern is Printed on a PVC Film".

A 6 mm thick PVC carrier plate made of hard PVC is used and a PVC film with a thickness of 0.03 mm is applied to it using a heated calender, so that the film is thermally welded to the carrier plate. The plate produced in this way is then subjected to the heat treatment described above after intercooling to 30-50° C., preferably. On the attached PVC film, the same décor image as in example 1 is produced using a digital printer. However, a solvent-based, UV-curing digital printing ink is used. To produce the printed image, a quantity of ink of about 2 g/m² is required. The ink is first fixed with 150 mJ/cm² (mercury). Then 2 g/m² of a first UV-curing layer is applied, which mainly contains dipropylene glycol diacrylate. On this non-irradiated layer a double bond containing oligomer mixed with photoinitiators is applied. The compound is then irradiated with a UV radiation source and the polymerizable components are cured. The resulting polymer layer comprises the printing ink and all layers above it.

BRIEF DESCRIPTION OF THE DRAWINGS:

In the following, the invention is explained in more detail using the figures, wherein:

FIG. 1a schematically shows a device for the heat treatment of a PVC plate;

FIG. 1b schematically shows the temperature curve in the device;

DETAILED DESCRIPTION

Figure 2:
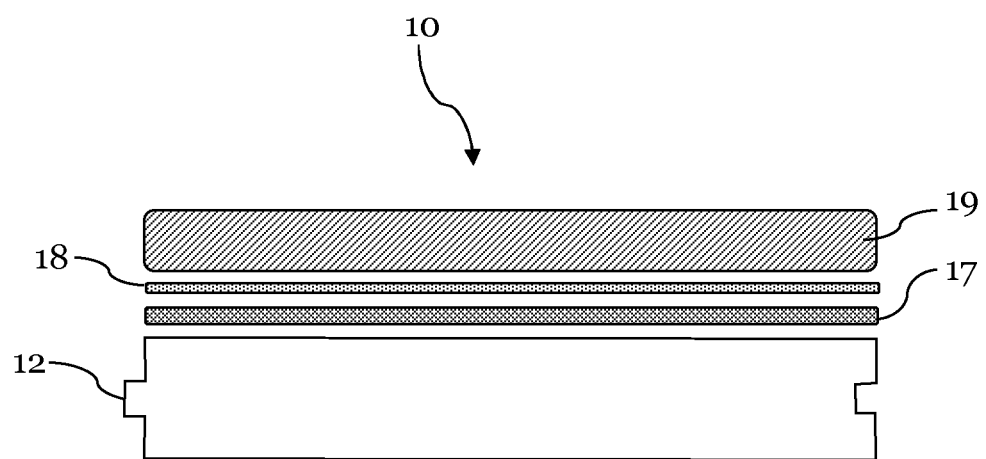
FIG. 2 shows a schematic diagram of a plate 10 with a carrier plate 12 made of polyvinyl chloride.

FIG. 1 schematically shows a device for the heat treatment of a PVC plate. The device essentially consists of an oven 1, which in the example shown is a continuous oven. The oven is equipped with a conveyor 2 which moves the parts to be treated through the oven in the direction of arrow 3. The reference sign 12 indicates PVC plates which are conveyed through the oven from left to right. Reference number 10 indicates finished panels which have already been coated or provided with films as described below. Such coated panels 10 can also be subjected to a heat treatment in order to treat the respective carrier plates 12 of the panels 10 accordingly. The oven 1 comprises seven zones O1 to O7 in which different temperatures are present. Of course the shown device is only exemplary and also devices with more or less zones as well as devices with completely different temperature profiles as presented herein are possible. The plates 12 or panels 10 enter the first zone O1 of the oven. The temperature within the first zone O1 rises continuously in the conveying direction of the oven.

The temperature course or the temperature profile within the individual zones of the oven is shown in FIG. 1b. The temperature is shown on the vertical axis and the horizontal axis corresponds to the course along the length of the oven ($L_{Oven}$). The dotted lines indicate the transition between the different zones O1 to O7. In the example shown, the temperature within zone O1 rises continuously with a relatively low rate of increase. The reason for this is that the panels or plates have a relatively low temperature when entering the oven, such as room temperature, and therefore even relatively low oven temperatures lead to rapid heating of the plates. This is because the speed at which the body is heated depends fundamentally on the temperature difference between the body and the surrounding air, for example. As the skilled person knows, large temperature differences lead to a greater transfer of heat energy and thus to a faster heating of the body. By a suitable selection of the temperature profile in the conveying direction of the oven, the temporal course of the heating of the plates can be controlled. It is desirable that the heating should be as homogeneous as possible, i.e., the heating or cooling gradient should be as constant as possible during treatment.

In zone O2, the temperature rises relatively more in the conveying direction than in zone O1. In zone O3 the temperature is kept constant, and the plates or panels are kept at the desired target temperature for a few minutes during transport through zone O3. In zone O4, the temperature in the oven is slowly lowered in the conveying direction, as can be seen from the relatively flat temperature course in FIG. 2b. In the following zones O5 to O7 the temperature then drops further and further, so that the plates or panels are slowly cooled down to a temperature close to the room temperature (e.g., 30 or 35° C.). The cooling phase is advantageous, as shown, longer than the heating phase, i.e., cooling should preferably take place relatively slowly. After the plates have left the oven, they can be stored or further processed as required.

FIG. 2 shows a panel 10 that is provided with several films or layers and can be used, for example, as a floor panel. The panel 10 comprises a plate (carrier plate) made of PVC 12, which has tongue and groove connections at its respective edges, which allow individual panels 10 to be connected with each other. The carrier plate consists of an extruded hard PVC (PVC-U) and can, for example, be heat-treated using one of the methods described herein.

Above the (carrier) plate 12 a PVC film 17 is arranged. A decorative pattern (décor layer) 18 is printed on the top side of film 17, preferably by means of a digital printing process. This decorative pattern can be any pattern, depending on the application. Above the PVC film and the décor layer, a UV-curable polymer layer system 19 is provided. The illustration is not true to scale, and the layers are shown here at a distance from each other not present in the real product in order to make them more clearly visible. In particular, the plate 12 is considerably thicker than the layers applied to it, namely in the range of several mm, whereas the layers applied to it represent only a fraction of a mm in total.

Figure 3:
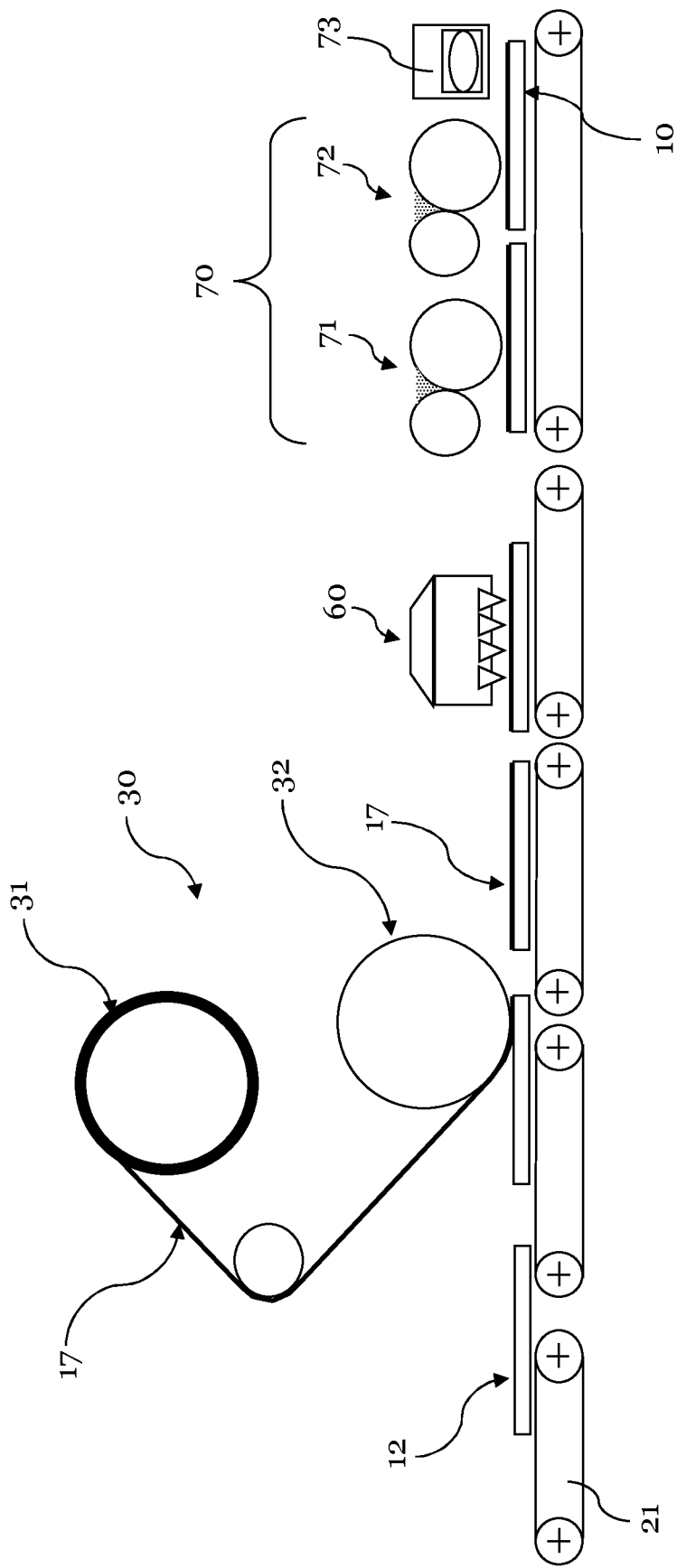
FIG. 3 shows a schematic view of a coating device.

In the following, FIG. 3 is used as an example to describe the manufacture of a panel according to the invention or the method required for this. FIG. 3 schematically shows a coating device for the coating of plates 12 or for the production of panels 10. The plates 12 consist of hard PVC with a thickness of 4-8 mm and were first subjected to the heat treatment described herein. Alternatively, the heat treatment described herein can also be carried out subsequently on the finished panel 10 or an intermediate product. The plates 12 are guided by a roller conveyor 21 through the various stations of the coating device. The coating stations shown are not to be understood conclusively, but serve only as examples to explain the method according to the invention and are shown purely schematically. In front of, behind and between the stations shown, further processing stations may be provided, such as further drying stations, stations for applying primers, stations for applying fillers, etc. The first station 30 is intended to be a calender unit used to apply the PVC film 17 to the top of the plates 12. The film is unwound from a supply roll 31 and attached to the top of the plates 12 by a heated calender roll 32. The film is cut to size using suitable cutting means known to a person skilled in the art (not shown).

In Station 60, a decorative décor, in particular a real wood décor, is printed on PVC film 17 using digital printing. After printing, a polymer layer is applied in the coating station 70. The polymer layer is applied with a hardness gradient, so that the hardness of the polymer layer decreases essentially continuously with increasing depth as seen from the surface of the polymer layer. For this purpose, a first polymer layer based on a polymerizable acrylate system is applied in a first coating unit 71. A further wet-on-wet polymer layer is applied to this first polymer layer in Station 72. The second polymer layer, for example, has a higher double bond content, as described in detail in the above-mentioned application on the hardness gradient. The two polymer layers are applied wet-on-wet in stations 71 and 72, so that partial mixing occurs at the interface of the two layers. In Station 73, the two polymer layers are cured together under the influence of UV radiation.

Station 60 is preferably a digital printing station and uses a printing ink based on a polymerizable acrylate. In this case, it is preferable that no curing of the ink takes place between stations 60 and 70, but at most an intermediate drying step during which some moisture is removed from the polymerizable acrylate of the ink. In the curing station 73, the printing ink and the first and second polymer layers are then cured together, resulting in a particularly resistant surface.

Comparison of Standard PVC and Heat-Treated PVC

Figure 4:
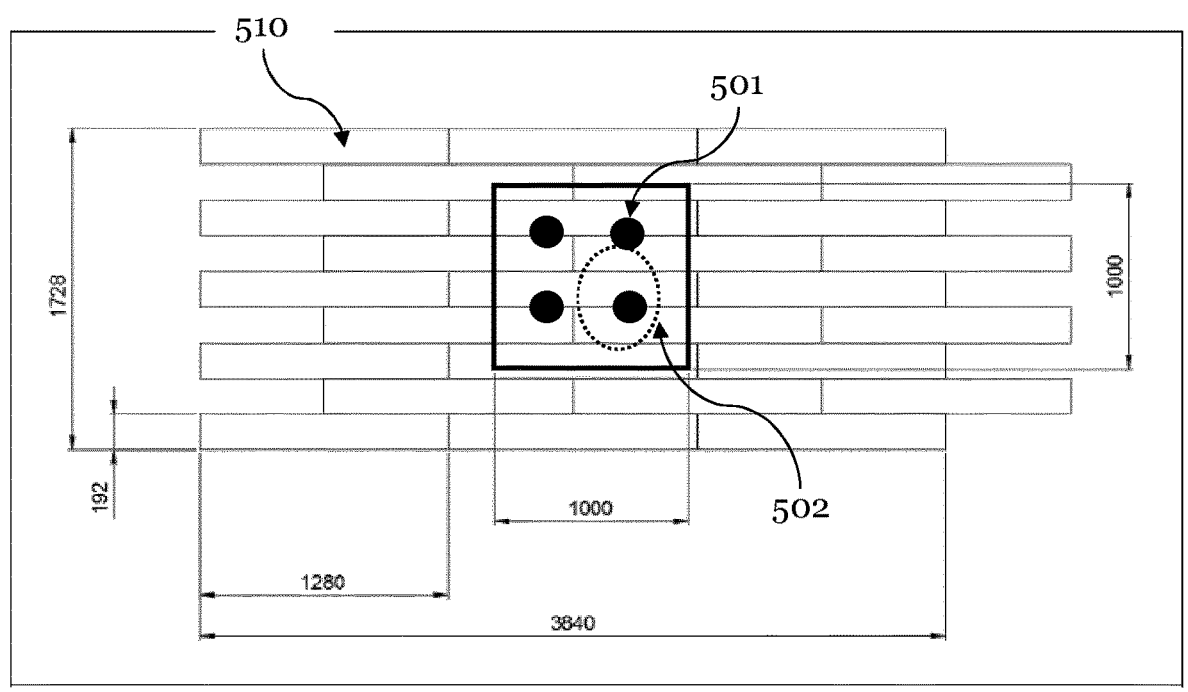
FIG. 4 schematically shows an experimental setup for the comparison of treated and untreated panels.

The effect of heat treatment according to the invention was investigated experimentally. For this purpose, a PVC carrier plate with a density of 2,050 kg/m$^3$ was extruded on a twin-screw extruder. This plate was then provided with a decorative high-performance layer and processed into floor panels 510. Panels manufactured in this way were laid to a test area of approx. 2×4 m ("standard PVC") as sketched in FIG. 4. As a comparison, after cooling to approx. 40° C., an identically extruded plate was heated again to 85° C. in an oven in accordance with the invention and then slowly cooled again ("heat-treated PVC"). Afterwards the same coating, panel production and laying to a second test area as in the case of the untreated panels 510 was carried out.

Both test areas were irradiated in an area of approx. 1 m$^2$ from above with four IR radiators 501 (as a simulation of solar radiation through deep-drawn windows, e.g., in a winter garden). The radiators heated the surfaces of the floors or panels at a rate of approx. 1° C./min up to a surface temperature of approx. 80° C. During irradiation, the maximum curvature of the panels was measured and recorded. The results of this test are summarized in the table below:

|  | Standard-PVC | Treated PVC |
| --- | --- | --- |
| Start curvature after t in min: | 25 | None |
| Start curvature at temperature in ° C.: | 50 | None |
| Maximum curvature in mm | 9.46 | None |
| Maximum curvature at temperature in ° C.: | 68.6 | None |
| $T_{max}$ during test in ° C. | 75.6 | 81 |
| Duration of irradiation in min | 127 | 124 |

In the case of non-heat-treated PVC ("standard PVC"), the floor beneath the 501 infrared lamps began to curve significantly after 25 minutes at a surface temperature of 50° C. The curvature occurred over a large area, as indicated by circle 502 in FIG. 4. The floor of treated PVC plates showed no visible curvature. The untreated floor ("Standard-PVC") reaches its maximum curvature of 9.5 mm at a surface temperature of 68.6° C. The floor of treated PVC plates showed no change at this temperature. The test was aborted after 127 min and a surface temperature of 81° C.

Throughout the area investigated, the floor of treated PVC plates was stable and showed no curvature behaviour. The surface temperatures achieved in the test correspond to those that can be achieved in practice when floors are exposed to direct sunlight, especially with dark decors. The problems with the standard PVC regularly led to complaints, so that a number of panel manufacturers point out on their packaging that the products are "not suitable for e.g., winter gardens and places with direct sunlight". The plates treated according to the invention do not show such problems.

The invention claimed is:

1. A panel, in particular a wall, ceiling or floor panel, comprising
   a polyvinyl chloride plate and
   a film attached to the polyvinyl chloride plate,
   wherein the film is a PVC film having a thickness of 0.04 to 0.2 mm and has a decorative pattern directly printed thereon,
   wherein a cured polymer layer is provided over the PVC film, and
   wherein a layer comprising a UV primer is provided on the PVC film.

2. The panel according to claim 1, wherein the polymer layer has a hardness gradient, so that the hardness of the polymer layer decreases essentially continuously with increasing depth as seen from the surface of the polymer layer.

3. The panel according to claim 1, wherein the printing ink used for printing the decorative pattern is solvent based.

4. The panel according to claim 3, wherein the printing ink contains a polymerizable acrylate and/or N-vinylcaprolactam.

5. The panel according to claim 4, wherein the printing ink for printing the decorative pattern contains a polymerizable acrylate and N-vinylcaprolactam in a weight proportion in the ink of 2 to 50.

6. The panel according to claim 1, wherein the printing ink and the polymer layer are cured together.

7. The panel according to claim 1, wherein the decorative pattern was applied by means of digital printing.

8. The panel according to claim 1, wherein the PVC film has a thickness from 0.05 to 0.15 mm.

9. The panel according to claim 1, wherein the PVC plate has a thickness between 3 and 20 mm.

10. The panel according to claim 1, wherein the layer comprising a UV primer has a surface mass of 1 to 15 $g/m^2$.

11. The panel according to claim 1, wherein the PVC plate is an extruded PVC plate.

12. The panel according to claim 1, wherein the PVC film is glued or thermally welded to the plate.

13. The panel according to claim 1, wherein abrasion-resistant particles are provided in the polymer layer.

14. The panel according to claim 1, wherein the polymer layer is based on one or more of the following acrylates: 1,6-hexane dioldiacrylate, polyester acrylate, polyurethane acrylic acid ester and dipropylene glycol diacrylate.

15. The panel according to claim 1, wherein, besides the decorative pattern on the PVC film, no further decor layers in particular no décor papers or décor films are provided.

16. The panel according to claim 1, wherein the directly printed decorative pattern imitates a wood, stone or tile surface.

17. The panel according to claim 1, wherein the polyvinyl chloride plate contains no plasticizers.

18. The panel according to claim 1, wherein the polyvinyl chloride plate consists of hard PVC (PVC-U).

19. The panel according to claim 1, wherein the printing ink is a UV printing ink.

20. The panel according to claim 13, wherein the abrasion-resistant particles comprise an average diameter of 10 to 150 μm.

* * * * *